Feb. 10, 1948.  E. H. LAND  2,435,720
APPARATUS FOR EXPOSING AND PROCESSING PHOTOGRAPHIC FILM
Filed Aug. 29, 1946  2 Sheets-Sheet 1

INVENTOR
Edwin H. Land
BY
Donald L. Brown
Attorney

Feb. 10, 1948. E. H. LAND 2,435,720
APPARATUS FOR EXPOSING AND PROCESSING PHOTOGRAPHIC FILM
Filed Aug. 29, 1946 2 Sheets-Sheet 2

INVENTOR
Edwin H. Land
BY Donald L. Brown
Attorney

Patented Feb. 10, 1948

2,435,720

UNITED STATES PATENT OFFICE 2,435,720

APPARATUS FOR EXPOSING AND PROCESSING PHOTOGRAPHIC FILM

Edwin H. Land, Cambridge, Mass., assignor to Polaroid Corporation, Cambridge, Mass., a corporation of Delaware Application August 29, 1946, Serial No. 693,708

28 Claims. (Cl. 95—13)

This invention relates to photography, and more particularly to apparatus for bringing photographically exposed photosensitive film material and individual sheets of another preferably nonphotosensitive material into operative assembly and for spreading a processing liquid within the assembly of materials by providing a predetermined compression thereof.

An object of the present invention is to provide novel photographic apparatus for positioning, in operative assembly, a photographically exposed film material, an individual sheet of another material, and a fluid releasably confined in a container attached to one of the materials, and for applying a predetermined pressure to the assembly for at least spreading the fluid between the aforesaid materials to process said photographically exposed film material and preferably to provide said assembly with a positive photographic image.

Another object of the invention is to provide photographic apparatus for positioning, in operative assembly, a photographically exposed film material, an individual sheet of another material, and a fluid releasably confined in a container attached to the last-named material, and for applying a predetermined pressure to the assembly of materials for releasing and spreading the fluid therebetween.

A further object of the invention is to provide, in camera apparatus adapted to supply and photographically expose roll film material, means for bringing individual sheets of another material into facing relationship with the exposed roll film material and for applying predetermined pressure to outer surfaces of the materials for at least spreading a fluid between inner facing surfaces of said materials.

Still another object of the invention is to provide in camera apparatus adapted to supply and photographically expose film material comprising photosensitive areas, a chamber for holding the film, a second chamber for releasably holding a plurality of sheets of another material adapted to superimposition with exposed frames of film and to subjection to pressure therewith for spreading a processing fluid at least over the exposed frames of film, the last-named chamber being pivotally mounted for assuming either an operative position substantially parallel to the optical axis of the camera or a nonoperative position substantially at right angles thereto and for providing at said last-named position a closure across the face of the camera for protecting the lens thereof.

A still further object of the invention is to provide a light-shielded passage connecting both of the aforementioned chambers at either operative or nonoperative position of the pivotally movable chamber.

Yet another object of the invention is to provide in camera apparatus of the character described means for registering separately supplied photographically exposed film material and individual sheets of another material suitable for carrying a visible positive image of the subject image of the exposed film whereby pre-established portions of each material may be superimposed and passed between pressure-applying means for processing of the film and formation of positive prints upon predetermined areas of the print-carrying sheets.

A further object of the invention is to provide in camera apparatus of the character described means comprising a chamber and magazine for releasably holding a supply of photographic film material and means comprising a second chamber for releasably holding a supply of individual sheets of another material for use in conjunction with processing the film material after its photographic exposure, one of the materials having fluid-containing portions incorporated therewith and the chamber holding the last-named material having means for relieving pressure on the fluid-containing portions of the material.

Still another object of the invention is to provide in camera apparatus of the character described means for superimposing film material and an individual sheet of another material for use in conjunction with processing the film, and for sealing longitudinal marginal portions of facing surfaces of the superimposed film and sheet material whereby, when the superimposed materials are subsequently subjected to progressively applied mechanical stress, a fluid releasably confined in a container attached to one of the facing surfaces may be released to unsealed portions thereof intervening between the sealed portions and spread over pre-established areas of the facing materials.

Other objects of the invention are the provision, in camera apparatus adapted to separately supply film material and individual sheets of another material, one of the materials releasably carrying a processing fluid, of rotatable pressure-applying means for releasing and spreading the fluid, of pressure-applying means fixed against rotation for a similar purpose, and of means for separating one pressure-applying element from another for introduction of film and other sheet materials therebetween.

These and other objects of the invention will be in part obvious and will in part appear hereinafter.

The invention accordingly comprises the construction, combination of elements, and arrangement of parts which are exemplified in the apparatus hereinafter described, and the scope of the application of which will be indicated in the claims.

In the drawings, wherein like reference characters refer to like parts throughout the several views.

Figure 1:
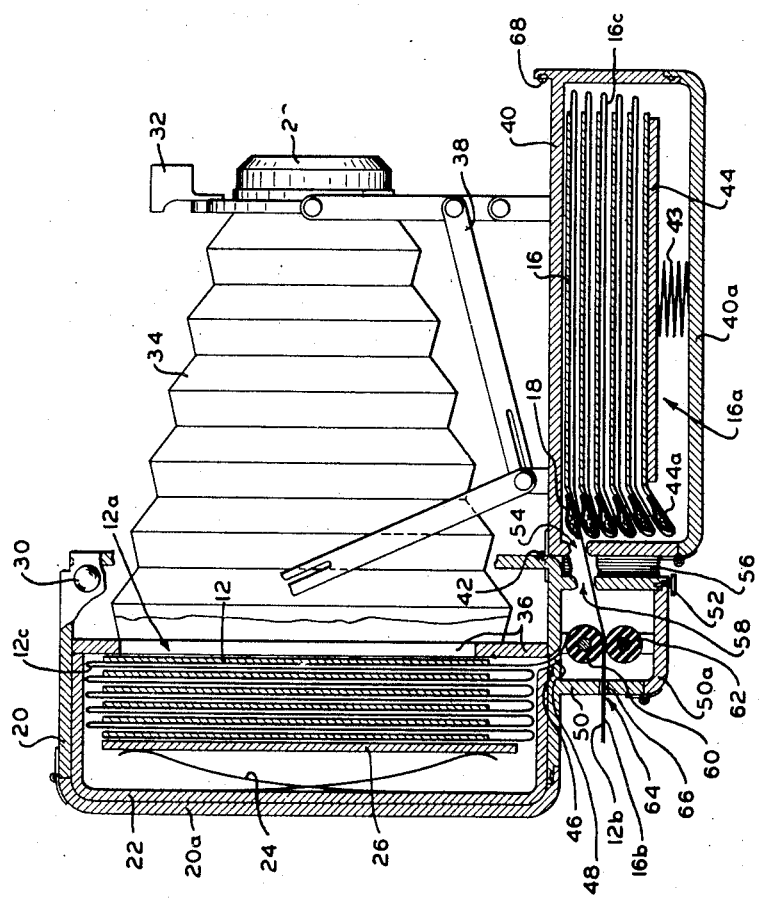
Figure 1 is a somewhat schematic side-elevation view, partly in cross-section and with parts broken away, of one form of the novel camera apparatus of the invention.

Camera apparatus of the general form comprehended by the invention is designed for use with photographic film comprising a light-sensitive area which may be supplied in the form of an individual film unit, a plurality of film units 12 in a film pack 12a (Fig. 1), or in the form of roll film 14 (Fig. 4), any of the aforesaid types of film, in turn, being suitable for employment with a sheet, or a plurality of sheets 16 in pack form 16a (Fig. 1), of a preferably opaque material separately supplied. The film material is photographically exposed in the camera by generally conventional means and an exposed area thereof is brought adjacent a surface of an individual sheet of material 16 by suitable guide means and by either manually propelling the materials as permitted by withdrawing suitable sheet material comprising leaders 12b and 16b thereof or by providing a propulsive mechanism for the purpose, not shown, but to be understood as possible of incorporation in the apparatus. It will be noted that individual units 12 of film pack 12a are mounted upon and interconnected by sheet-like strips of material 12c, as, for example, by strips of an opaque paper whereby forces of propulsion may be transmitted from one unit to another and an opaque backing is provided for each unit which prevents the passage of light therethrough. A similar construction is shown for propulsion of sheets 16 of sheet pack 16a, said sheets being preferably opaque and mounted upon and interconnected by strips 16c.

The individual sheets of material 16 may serve one or a combination of functions as, for example, that of contributing a substantially planar fluid-confining surface during the operation of spreading a processing fluid over a photographically exposed area of the film when superimposed and subjected to progressive pressure therewith, that of carrying a collapsible container releasably confining said fluid and mounted on a surface portion of the sheet adjacent that portion to be superimposed with said area of film, the container being adapted to release the fluid when subjected to mechanical stress, and the function of serving as a receiving or carrying sheet for a visible positive image formed thereupon when superimposed and compressed with the exposed film and subjected to the processing fluid therewith.

As employed in a preferred form of the invention shown in Fig. 1, the sheets of material 16 serve at least the functions of carrying the fluid in containers 18, one container being associated with each sheet, and of contributing to the spreading of the fluid, as will presently be described in greater detail, the sheets likewise being adapted to carry the completed positive image which may be formed directly thereupon or within a layer formed thereon comprising an ingredient of said fluid. Thus, although said sheets of material 16 may serve any one of the plurality of functions above described, they will, henceforth, be termed print carrier sheets for purposes of identification herein.

Referring in greater detail to Fig. 1, elements more particularly related to supply and photographic exposure of the film material 12 comprise a film chamber formed by casing 20 comprising pivotally mounted casing portion 20a providing access means to said chamber, removable film magazine 22, compression spring 24, pressure plate 26, lens 28, shutter release 30, view finder 32, bellows 34, framing plate 36, and self-erecting front mechanism 38, it being understood that elements shown for exposure of the film represent suitable folding camera components generally, and not necessarily a preferred design thereof.

A suitable chamber for holding a plurality of individual sheets 16 and attached containers 18 is formed by casing 40 pivotally attached to casing 20 by hinge means 42 and having pivotally mounted casing portion 40a providing access means to said chamber. As shown, the individual sheets 16 are mounted directly within casing 40, being biased toward a wall portion thereof by means of compression spring 43 and pressure plate 44, said pressure plate having an extended yielding portion 44a so formed as to permit unconstricted positioning of fluid containers 18.

It will be understood that a magazine similar to magazine 22 for holding the film may be mounted within casing 40 for holding sheets 16 or that film 12 may, if preferred, be mounted directly within casing 20, obviating the need for magazine 22 therein.

Loading of film pack 12a and print carrier sheet pack 16a may be performed by opening casing portions 20a and 40a, respectively, and inserting said materials to the positions shown. The film may thus be loaded either in a darkroom or, assuming said film to be supplied in magazine 22 and to be provided with an opaque leader covering front portions thereof which may be removed after loading, the film may be loaded in daylight. The film leader 12b is passed through aperture 46 formed in casing 20 and having light-shielding strips 48 associated therewith and is led into a chamber formed by casing 50 having pivotally mounted casing portion 50a secured to casing 50 by locking means 52. The print carrier leader 16b is also led into said chamber through aperture 54 formed in casing 40, through means interconnecting casing 40 and casing 50 such, for example, as a collapsible bellows 56, and through aperture 58 in said casing 50, it being noted that apertures 54 and 58 are of sufficient width to permit unimpeded passage of the fluid containers and print carrier sheets therethrough.

Figure 2:
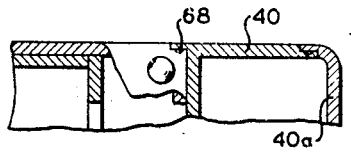
Fig. 2 is a fragmentary, schematic side-elevation view showing the chamber of Fig. 1 for supplying a plurality of individual sheets of material in closed or nonoperative position.
Figure 2:
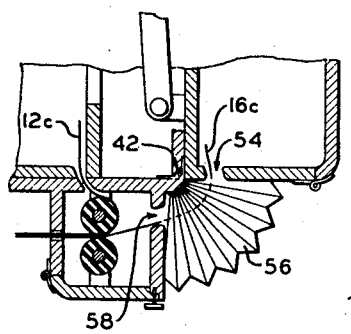

Within the chamber formed by casing portions 50, 50a and a section of casing 20 suitable means for applying pressure to the film and print carrier sheets are mounted. In the embodiment of Figs. 1 and 2 said means comprise a pair of rotatable pressure-applying elements 60 and 62 having, for example, resilient surfacing and extending transversely across predetermined portions of the film and print carrier sheets. Element 62 is mounted upon a stud extending inwardly from pivotally mounted casing portion 50a and upon releasing lock 52 and opening said portion 50a for purposes of threading leaders 12b and 16b said element 62 will, accordingly, be caused to move away from element 60, thus permitting ready insertion of said leaders between elements 60 and 62, passage of the leaders through aperture 64 having light-shielding strips 66 associated therewith, and closure of casing portion 50a.

As shown in Fig. 1, film 12 is positioned for photographic exposure against framing plate 36, film and print carrier sheet leaders have been threaded through the aforesaid apertures provided therefor and between pressure-applying means 60 and 62 to a position exterior of the casing whereby their extremities may be grasped by the operator, means for fastening said extremities, such as an adhesive or snap fastener preferably being provided.

It will be noted that positioning of the supply chambers for film 12a and sheet material 16a, relative to positioning of pressure-applying means 60, 62 is such that the distance of travel of said film and sheet material and that of respective interconnecting strips between said chambers and pressure-applying means is identical, thus insuring proper registration of the film and print carrier sheet between said pressure-applying means, it being understood that respective film units, print carrier sheets, leaders, and interconnecting strips are of suitable length for the purpose.

In operation, after photographic exposure of film unit 12, leaders 12b, 16b are drawn away from casing 50, said unit is thereby superimposed with a print carrier sheet 16, the processing fluid within containers 18 is released to the print carrier material and spread between the film and print carrier materials by pressure-applying means 60, 62 engaging and constraining outer surfaces of said materials, and a positive image of the subject image of said photographic exposure is duly formed therewithin, said assembly of materials having opaque outer surfaces being withdrawn from the camera, severed from interconnecting strips 12c and 16c by suitable means such as the provision of perforations in the strips or a cutting blade, and, after completion of the image formation, being stripped apart for viewing said image. Suitable indicia may be provided on the back of strip 12c or 16c for ascertaining the proper length thereof to be withdrawn from the camera for processing each film, as, for example, the provision of lines placed tranversely of said strip at proper intervals, said lines following portions designed for severance and being suitable for positioning adjacent the visible edges of aperture 64. After withdrawal of each unit of film and print carrier sheet from the camera and severance thereof from strips 12c and 16c, it will be apparent that succeeding portions of said strips will remain projecting through aperture 64 and provide means for withdrawing following units until the chambers are exhausted. It will likewise be obvious that suitable numerical indicia may be provided on said strips for designating the number of the assembly containing the positive print whereby the supply of remaining exposable film units may be determined.

Fig. 2 shows casing 40 pivotally rotated on hinge 42 to inoperative position whereby said casing provides a front for the camera and is thus releasably attached to casing 20 by latch 68, bellows 56, interconnecting apertures 54 and 58, being suitably extensible for permitting said movement of casing 40.

Figure 3:
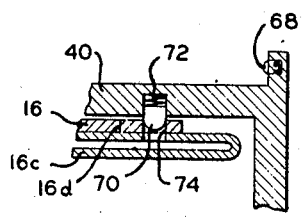
Fig. 3 is a fragmentary, cross-sectional view of a modification of elements for releasably holding a plurality of individual sheets of material, similar to those shown in Fig. 1, in a magazine.

In Fig. 3 a fragmentary portion of a modified chamber for holding print carrier sheets is illustrated, said chamber comprising releasable detent means 70, actuated by spring 72 and adapted to enter concavity 74 formed in the print carrier sheet beyond limit 16d of the image area thereof, the detent entering said concavity of each sheet when the sheet is forced against wall 40 of the chamber, as, for example, by pressure plate 44 and spring 43 of Fig. 1, and being releasable from the concavity only upon exerting a greater withdrawal force upon the materials than is generally required for causing said movement thereof. Said modification provides means for establishing position of each print carrier sheet in the supply chamber and correct positioning of each film unit for exposure, assuming correct registration of the leaders of the respective materials to have been accomplished. It will be understood that, alternatively, means for a similar purpose may be embodied in the film holding means of Fig. 1 as, for example, in a portion of framing plate 36 in such manner as to engage the film 12 in an area thereof exclusive of the image area or a portion of strip 12c adjacent said framing plate.

Figure 4:
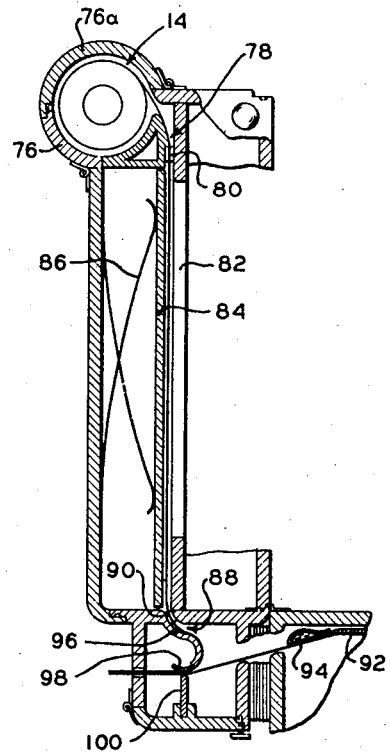
Fig. 4 is a fragmentary, schematic, side-elevation view of a modification of the film-supplying and pressure-applying elements of Fig. 1.

The modification of Fig. 4 illustrates apparatus suitable for use with roll film, said film 14 preferably having an opaque backing material and being supplied from a film holder comprising casing 76 and pivotally mounted casing portion 76a providing access means thereinto. Suitable means comprising aperture 78 having light-shielding strips 80 associated therewith are provided for passing said film from the film holder to the focal plane wherein the film is held in position for photographic exposure by framing plate 82, pressure plate 84 and compression spring 86. Means providing a passage for removing the film from the focal plane comprise aperture 88 having light-shielding strips 90 associated therewith. Pressure-applying elements for processing each photographically exposed frame of the film, as hereinbefore described, in conjunction with an individual sheet of print carrier material 92 having a fluid confining container 94 incorporated therewith comprise two elements fixed against rotation and positioned to extend transversely across and impinge outer surfaces of the superimposed film and print carrier sheets. Guide 96 generally formed as shown and being substantially of equal width to that of the film comprises means for leading the film to pressure-applying element 98, said element being shown as a metal strip which may be either resilient or rigid according to pressure requirements of the film and print carrier sheets and the viscosity of the fluid to be spread therebetween. Pressure-applying element 100 is shown as a rigid component but may be of a resilient construction or biased in a direction toward the sheet material by a spring as determined by the aforesaid considerations relating to construction of element 98. Other elements shown are similar to those of Fig. 1, and require no further description, it being understood that the mechanism of Fig. 4 may be incorporated with suitable camera means as, for example, with the camera and supply chamber for print carrier sheets 16 of Fig. 1, operation of the modified apparatus being generally similar to that previously described with respect to apparatus of Fig. 1.

Figure 5:
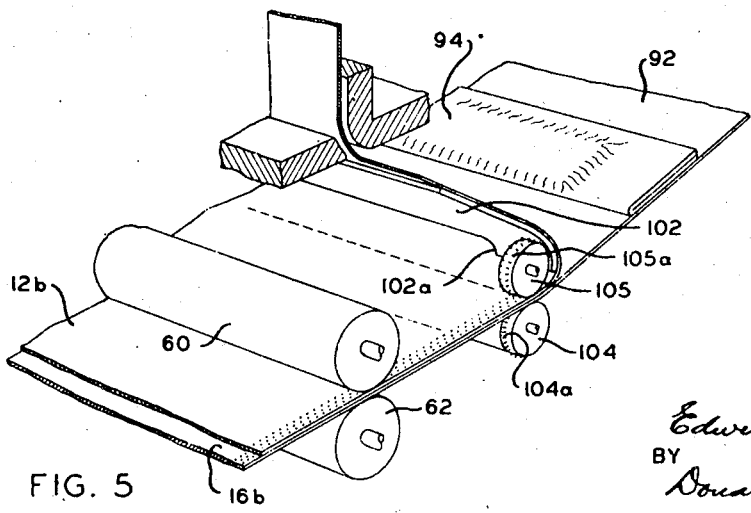
Fig. 5 is a fragmentary, schematic view of a modification of film and sheet material feeding mechanism wherein means are shown for superimposing and sealing longitudinal marginal portions of the materials prior to application of pressure thereto.

Fig. 5 illustrates a modification of film guiding and film and print carrier superimposing mechanism and means for sealing together longitudinal marginal portions of said materials, the modification being suitable for mounting in association with pressure-applying elements of either Fig. 1 or Fig. 4, said elements of Fig. 1 being shown. Elements of Fig. 5 comprise a guide 102 terminating in two fork-like members 102a adapted to engage longitudinal marginal portions only of film 14 just prior to superimposition of the film and sheet material whereby container 94, being of a lesser width and thickness than the length of and spacing between said members 102a, may pass unimpeded therebetween. Other elements comprise rollers 104 and 105 rotatably mounted for engaging predetermined portions of the materials passing between their surfaces, said roller 104 preferably being a single roller of a width at least equal to that of the film and sheet materials and roller 105 being one of a pair of rollers for engaging longitudinal marginal portions of the superimposed materials. The rollers may preferably comprise surfacing elements for crimping or otherwise bonding said marginal portions together as, for example, projecting metallic elements 104a and 105a. The aforesaid guide 102 provides for superimposing the materials prior to their introduction between pressure-applying elements 60 and 62 whereby the fluid within container 94 may be immediately released between said materials when stress for collapse of said container is applied thereto by said elements 60 and 62. Rollers 104 and 105 having bonding means shown or having pressure-applying surfaces for use in conjunction with an adhesive suitably coated on longitudinal marginal portions of either the film or print carrier sheets, comprise means for sealing said portions of both materials together and thereby defining the transverse limits of spreading of the fluid by said pressure-applying means 60 and 62. The marginal sealing device of Fig. 5 provides a light-tight seal for the photosensitive film material and thus permits positioning of pressure-applying elements exteriorly of the camera casing, provided the sealed film and print carrier material are passed thereto through aperture means having light-shielding material of greater yielding characteristics than the fluid container whereby said container will not be collapsed when passing therethrough.

It will be apparent that further modifications of the apparatus are possible without departing from the scope of the invention as, for example, omission of the bellows-like passage 56 of Figs. 1 and 2 and provision of suitable light-tight closures for aperture 54 and a suitable dust seal for aperture 58 when the chamber for holding print carrier material is in nonoperative position. It will also be obvious that repositioning of the novel elements of the invention may be altered without materially affecting their operability. While fluid containers are shown as incorporated with the print carrier sheet material, they may, alternatively, be incorporated with the film.

While separate chambers are shown for supplying, respectively, a plurality of photographically exposable frames of film and a like number of sheets of another material for superimposition therewith, it will be apparent that individual units of one or of both materials may be supplied for assembly with the other as, for example, by the provision of a suitable aperture or apertures in the casing for introduction thereof to the mechanism. It will also now be apparent that portions of the apparatus comprising supply means for the individual sheets of material and pressure-applying means could, through further modifications of design and positioning thereof, be incorporated in an attachment for a camera or could be mounted in a photographic darkroom for use with photographically exposed frames of film.

Since certain changes in the constructions set forth which embody the invention may be made without departing from its scope, it is intended that all matter contained in the above description or shown in the accompanying drawings shall be interpreted as illustrative and not in a limiting sense.

What is claimed is:

1. Apparatus for successively exposing a plurality of areas of photosensitive film material and for processing said areas after exposure thereof in conjunction with a plurality of separately supplied sheets of another material, one of said materials having a releasably contained processing fluid incorporated therewith, said apparatus comprising, in combination, means forming a main chamber wherein said film material may be exposed, means forming a second chamber for releasably holding said plurality of sheets of material, means providing a light-shielded aperture in said main chamber means and other means providing an aperture in said second chamber means whereby said materials may be withdrawn from said chambers for superimposition with one another, means for superimposing and compressing the materials, said chambers being so related to said compressing means as to have said apertures positioned adjacent said compressing means, said compressing means being adapted to apply a predetermined pressure to successive increments of said film and other material for spreading said fluid therebetween, and means acting to exclude actinic light from portions of said superimposing means which are in contact with said materials during operation of said apparatus.

2. Apparatus for successively exposing a plurality of areas of photosensitive film material and for processing said areas after exposure thereof in conjunction with a plurality of separately supplied sheets of another material, one of said materials having a releasably contained processing fluid incorporated therewith, said apparatus comprising, in combination, means forming a main chamber wherein said film material may be exposed, means forming a second chamber for releasably holding said plurality of sheets in stacked relation, said second chamber during operation of said apparatus holding said sheets with the planes thereof substantially angularly disposed relative to an exposure plane of said apparatus, means providing a light-shielded aperture in said main chamber means and other means providing an aperture in said second chamber means whereby said materials may be withdrawn from said chambers for superimposition with one another, means for superimposing and compressing the materials, said chambers being so related to said compressing means as to have said apertures positioned adjacent said compressing means, said compressing means being adapted to apply a predetermined pressure to successive increments of said film and other material for spreading said fluid therebetween, and means acting to exclude actinic light from portions of said superimposing means which are in contact with said materials during operation of said apparatus.

3. Apparatus for successively exposing a plurality of frames of photosensitive film material and for processing said frames after exposure thereof in conjunction with a plurality of separately supplied sheets of another material, one of said materials having a releasably contained processing fluid incorporated therewith, said apparatus comprising, in combination, means forming a main chamber wherein said film material may be exposed, means forming a second chamber for releasably holding said plurality of sheets in stacked relation, said second chamber means being pivotally mounted with respect to said main chamber means, means providing a light-shielded aperture in said main chamber means and other means providing an aperture in said second chamber means whereby said materials may be withdrawn from said chambers for superimposition with each other, means for superimposing and compressing the materials, said chambers being so related to said compressing means as to have said apertures positioned adjacent said compressing means, said compressing means being adapted to apply a predetermined pressure to successive superimposed increments of said film and other material for spreading said fluid therebetween, and means acting to exclude actinic light from portions of said superimposing means which are in contact with said materials during operation of said apparatus.

4. Apparatus for successively exposing a plurality of frames of photosensitive film material and for processing said frames after exposure thereof in conjunction with a plurality of separately supplied sheets of another material, one of said materials having a releasably contained processing fluid incorporated therewith, said apparatus comprising, in combination, means forming a main chamber wherein said film material may be exposed, means forming a second chamber for releasably holding said plurality of sheets, said second chamber means being pivotally mounted with respect to said main chamber means, said second chamber means providing at one position thereof a closure for the front of the apparatus and being adapted to be pivoted away from said position to permit operation of said apparatus, means providing a light-shielded aperture in said main chamber means and other means providing an aperture in said second chamber means whereby said materials may be withdrawn from said chambers for superimposition with one another, means for superimposing and compressing the materials, said chambers being so related to said compressing means as to have said apertures positioned adjacent said compressing means, said compressing means being adapted to apply a predetermined pressure to successive increments of said film and other material for spreading said fluid therebetween, and means acting to exclude actinic light from portions of said superimposing means which are in contact with said materials during operation of said apparatus.

5. Apparatus for successively exposing a plurality of frames of photosensitive film material and for processing said frames after each exposure thereof in conjunction with a plurality of separately supplied sheets of another material, one of said materials having a releasably contained processing fluid incorporated therewith, said apparatus comprising, in combination, means providing a main chamber wherein said film material may be exposed, means providing a second chamber for releasably holding said plurality of sheets in stacked relation, means providing a light-shielded aperture in said main chamber means and other means providing an aperture in said second chamber means whereby said materials may be withdrawn from said chambers for superimposition with each other, means for superimposing and compressing the materials, said chambers being so related to said compressing means as to be substantially equidistant from said compressing means in terms of the paths of travel of said materials, said compressing means being adapted to apply a predetermined pressure to successive increments of said film and other material for spreading said fluid therebetween, and means acting to exclude actinic light from portions of said superimposing means which are in contact with said materials during operation of said apparatus.

6. Apparatus for successively exposing a plurality of areas of photosensitive film material and for processing said areas after each exposure thereof in conjunction with a plurality of separately supplied sheets of another material, one of said materials having a releasably contained processing fluid incorporated therewith, said apparatus comprising, in combination, means providing a main chamber wherein said film material may be exposed, means providing a second chamber for releasably holding said plurality of sheets in adjacent relation, said second chamber means being pivotally mounted upon said main chamber means, means providing a light-shielded aperture in said main chamber means and other means providing an aperture in said second chamber means whereby said materials may be withdrawn from said chambers for superimposition relative to one another, means for superimposing and applying a predetermined pressure to the materials while being moved, said chambers being so related to said pressure-applying means as to have said apertures adjacent said last-named means, said pressure-applying means being adapted to compress successive increments of said film and other material for spreading said fluid therebetween, means acting to exclude actinic light from portions of said superimposing means which are in contact with said materials during operation of said apparatus, and means providing a light-tight passage between said light-excluding means and said second chamber throughout the various pivotal positions of said second chamber.

7. Photographic apparatus for individually processing a plurality of photographically exposed frames of photosensitive film material in conjunction with a plurality of separately supplied sheets of another material, the photographically exposed surface of each of said frames of film being adapted to face-to-face superimposition with a predetermined surface area of an individual sheet of said other material, one of said materials releasably carrying a processing fluid, said apparatus comprising, in combination, means providing a chamber for said plurality of sheets of material, means providing a light-tight chamber separate from said first-named chamber for containing said photosensitive film material and from which an exposed frame of said film may be withdrawn for superimposition with one of said sheets of other material, means for mounting said chamber means for pivotal movement with respect to one another, said chambers during nonoperation of said apparatus providing a closure for the front of the apparatus and being adapted to be pivoted away from said frontal closure position to permit operation of said apparatus, and means comprising at least an element having a surface positioned to bear against a surface of the superimposed materials for applying a predetermined pressure thereto to release and spread said fluid between facing surfaces thereof.

8. Photographic apparatus for individually processing a plurality of photographically exposed frames of photosensitive film material in conjunction with a plurality of separately supplied sheets of another material, each of said sheets being adapted to carry a visible positive image of a subject image to which an individual area of said film is exposed, the photographically exposed surface of each frame of film being adapted to face-to-face superimposition with a surface area of an individual sheet of said other material, each of said sheets having a releasably contained processing fluid incorporated therewith in a container, said apparatus comprising, in combination, means forming a chamber for supplying said plurality of sheets of material adapted to carry a visible positive image, means comprising a guide element formed to extend transversely across and to engage predetermined marginal portions of at least one of said materials for superimposing said surface of the material thus engaged and said surface of the other material, said engagement excluding compression of the fluid container incorporated with one of said materials, and means comprising a pressure-applying element positioned to extend transversely across predetermined longitudinal portions of said materials, said last-named means having a pair of surfaces positioned to bear against opposite surfaces of the superimposed materials for applying a predetermined pressure thereto for release and spreading of said fluid between said face-to-face surfaces thereof.

9. Photographic apparatus for individually processing a plurality of photographically exposed frames of photosensitive film material in conjunction with a plurality of separately supplied sheets of another material, each of said sheets being adapted to carry a visible positive image of a subject image to which an individual area of said film is exposed, the photographically exposed surface of each frame of film being adapted to face-to-face superimposition with a surface area of an individual sheet of said other material, each of said sheets having a releasably contained processing fluid incorporated therewith in a container, said apparatus comprising, in combination, means providing a chamber for supplying said plurality of sheets of material adapted to carry a visible positive image, means for superimposing one of said frames of photosensitive film and one of said sheets of other material and for engaging marginal portions of said superimposed materials to effect at least a temporary seal at said marginal portions, said engagement excluding compression of the fluid container incorporated with one of said materials, and means comprising a pressure-applying element positioned to extend transversely across said materials, said last-named means having a pair of surfaces positioned to bear against the superimposed materials for applying a predetermined pressure thereto for release and spreading of said fluid between said face-to-face surfaces thereof.

10. Photographic apparatus for individually processing a plurality of photographically exposed frames of photosensitive film material in conjunction with a plurality of separately supplied sheets of another material, each sheet being adapted to carry a visible positive image of the subject image of an individual photographic exposure, the photographically exposed surface of each frame of film being adapted to face-to-face superimposition with a predetermined surface area of a sheet of said other material, said plurality of sheets having a releasably contained processing fluid incorporated therewith in a plurality of containers, each container being so positioned to one side of said predetermined surface area of an individual sheet that, during movement of said materials within the apparatus in a predetermined direction, said fluid may be released to said surface area and may be spread between both of said superimposed face-to-face surfaces, said apparatus comprising, in combination, means forming a chamber for supplying said plurality of sheets of material adapted to carry said visible positive image, means comprising a guide element formed to extend transversely across and to engage predetermined marginal portions of at least one of said materials for superimposing said surface of the material thus engaged and said surface of the other material, said engagement excluding compression of the fluid container incorporated with one of said materials, means adjacent said guide element for engaging predetermined marginal portions of said superimposed materials, said means comprising a pair of elements adapted to bond said portions together and to provide a seal substantially impervious to passage of said fluid therebetween, means comprising a pair of pressure-applying elements positioned to extend transversely across said materials, each of said elements having a surface adapted to bear against the superimposed materials for applying a predetermined pressure thereto for release and spreading of said fluid between said face-to-face surfaces thereof, and means providing the exclusion of actinic light from said superimposing and bonding means.

11. Photographic apparatus for successively processing a plurality of photographically exposed frames of photosensitive film material in conjunction with a plurality of separately supplied sheets of another material, each sheet being adapted to carry a visible positive image of the subject image of an individual photographic exposure, the photographically exposed surface of each frame of film being adapted to face-to-face superimposition with a predetermined surface area of a sheet of said other material, said plurality of sheets having a releasably contained processing fluid incorporated therewith in a plurality of containers, each container being so positioned to one side of said predetermined surface area of an individual sheet that, during movement of said materials within the apparatus in a predetermined direction, said fluid may be released to said surface area and may be spread between both of said superimposed face-to-face surfaces, said apparatus comprising, in combination, means providing a chamber for mounting said plurality of sheets of material adapted to carry said positive image, means comprising a guide element formed to extend transversely across and to contact only predetermined marginal portions of at least one of said materials for superimposing said surface of the material thus engaged and said surface of the other material, said guide element comprising an arched mid-portion adapted to remain out of contact with the fluid container incorporated with one of said materials, means adjacent said guide element engaging opposite marginal portions of both said superimposed materials for bonding said marginal portions together, said means comprising a pair of pressure rollers having non-yielding protuberances predeterminedly positioned on the surfaces thereof for penetrating and interlocking said marginal portions of the materials, means comprising a pair of pressure-applying elements positioned to extend transversely across said materials, each of said elements having a surface adapted to bear against the superimposed materials and to apply a predetermined pressure thereto for release and spreading of said fluid between said face-to-face surfaces thereof, and means providing the exclusion of actinic light from said superimposing and bonding means.

12. In camera apparatus of a folding type comprising a casing, a collapsible bellows and a lens assembly adjacent an extremity of said bellows, said camera apparatus being capable of individually processing a plurality of photographically exposed frames of photosensitive film material after each exposure thereof in conjunction with a plurality of separately supplied sheets of another material, one of said materials having a releasably contained processing fluid incorporated therewith in a container, the combination with said casing, bellows and lens assembly of means forming a chamber within the camera casing for holding a plurality of exposable areas of film and wherein said frames may be exposed, said chamber means being provided with an aperture suitably formed for movement of each exposed frame of film therefrom in a direction for superimposition with a designated sheet of said other material, and means pivotally attached to said camera casing providing a chamber for holding a plurality of sheets of material suitable for superimposition with said exposed frames of film and being provided with an aperture for releasing said sheets therefrom in a direction adapted to said superimposition, said sheet-holding chamber being adapted to be releasably held at a position placing said aperture thereof for release of said sheets in said direction and said sheet-holding chamber being pivotally rotatable to a position whereat said chamber provides a closure for frontal portions of the camera including said collapsed bellows and lens assembly during nonoperation of said camera apparatus.

13. In camera apparatus of a folding type comprising a casing, a collapsible bellows and a lens assembly adjacent an extremity of said bellows, said camera apparatus being capable of individually processing a plurality of photographically exposed frames of photosensitive film material after each exposure thereof in conjunction with a plurality of separately supplied sheets of another material, one of said materials having a releasably contained processing fluid incorporated therewith in a container, the combination with said casing, bellows and lens assembly of means providing a chamber within the camera casing for holding a plurality of exposable areas of film and wherein said frames may be exposed, said chamber means being provided with an aperture suitably formed and positioned for movement of each exposed frame of film therefrom in a direction for superimposition with a designated sheet of said other material, means pivotally attached to said camera casing providing a chamber for holding a plurality of sheets of material suitable for superimposition with said exposed frames of film and being provided with an aperture for releasing said sheets therefrom in a direction adapted to said superimposition, said sheet-holding chamber being held substantially at right angles to said film-holding chamber during operation of said camera and providing at least a surface cooperating with bellows-extending and focusing means of said apparatus, said sheet-holding chamber being pivotally rotatable to a position whereat said chamber provides a closure for frontal portions of the camera including said collapsed bellows and lens assembly during nonoperation of said camera apparatus, means comprising at least a pressure-applying element positioned transversely across a predetermined portion of said materials, said element comprising at least a surface adapted to bear against a surface of said materials and to apply a predetermined pressure thereto for releasing and spreading said fluid between facing surfaces of said materials, and means forming a chamber for excluding actinic light from said pressure-applying means, said last-named means being provided with an aperture for removing said film and sheet material from said chamber.

14. Apparatus for successively processing a plurality of photographically exposed frames of photosensitive film material after each exposure thereof in conjunction with a plurality of separately supplied sheets of another material, one of said materials having a releasably contained processing fluid incorporated therewith, said apparatus comprising, in combination, means providing a chamber for releasably holding said film material, means forming a chamber for releasably holding said plurality of sheets, said second-named chamber means being pivotally mounted upon said first-named chamber means and being adapted to provide a closure for the front of the camera apparatus during periods when said camera apparatus is not in use, means providing an aperture in each of said chamber means whereby the materials may be withdrawn from said chambers and superimposed one upon the other, means mounted adjacent the apertures of said chambers for applying a predetermined pressure to said materials when withdrawn from said apertures and superimposed, said last-named means being adapted to apply said pressure so as to release and spread the fluid carried by one of said materials throughout facing surface areas of said materials, means comprising a third chamber for containing said pressure-applying means, and means providing a light-tight passage between said third chamber and said second-named pivotal chamber, said passage means being formed for providing a passage of varying length according to the pivotal position of said second-named chamber.

15. Photographic apparatus for individually processing a plurality of photographically exposed frames of photosensitive film material in conjunction with a plurality of separately supplied sheets of another material, the exposed surface of each of said frames of film being adapted to be placed in face-to-face superimposed relation to an individual surface of said other material, one of said materials having a releasably contained processing fluid incorporated therewith in a plurality of containers, said apparatus comprising, in combination, means forming a chamber for supplying said plurality of sheets of material, means providing a light-tight chamber separate from said first-named chamber for releasably containing said photosensitive film material and from which an exposed frame of said film material may be withdrawn for superimposition with one of said sheets of other material, means comprising a pair of pressure-applying elements positioned so as to extend transversely across predetermined portions of said materials when said materials are advanced therebetween, each of said elements having a surface adapted to bear against a surface of said materials for applying a predetermined pressure thereto to release and spread said fluid between said face-to-face surfaces thereof, and means for separating said pair of pressure-applying elements.

16. Photographic apparatus for individually processing a plurality of photographically exposed frames of photosensitive film material in conjunction with a plurality of separately supplied sheets of another material, the exposed surface of each of said frames of film being adapted to be placed in face-to-face superimposed relation to an individual surface of said other material, one of said materials having a releasably contained processing fluid incorporated therewith in a plurality of containers, said apparatus comprising, in combination, means providing a chamber for mounting said plurality of sheets of material adapted to superimposition with said frames of film, means providing a light-tight chamber separate from said first-named chamber separate from said first-named chamber for releasably containing said photosensitive film material and from which an exposed frame of said film material may be withdrawn for superimposition with one of said sheets of other material, means for superimposing and compressing said materials comprising a pair of pressure-applying elements positioned so as to extend transversely across predetermined portions of said materials when said materials are advanced therebetween, each of said elements having a surface adapted to contact a surface of said materials for applying a predetermined pressure thereto to release and spread said fluid between said face-to-face surfaces thereof, means for separating said pair of pressure-applying elements for threading sheet materials therebetween, and means providing a light-tight chamber for said superimposing means.

17. Photographic apparatus for individually processing a plurality of photographically exposed frames of photosensitive film material in conjunction with a plurality of separately supplied sheets of another material, the exposed surface of each of said frames of film being adapted to be placed in face-to-face superimposed relation to an individual surface of said other material, one of said materials having a releasably contained processing fluid incorporated therewith in a plurality of containers, said apparatus comprising, in combination, means forming a chamber for supplying said plurality of sheets of material adapted to superimposition with said frames of film, means forming a light-tight chamber separate from said first-named chamber for releasably containing said photosensitive film material and from which an exposed frame of said film material may be withdrawn for superimposition with one of said sheets of other material, means comprising a pair of pressure-applying elements positioned so as to extend transversely across predetermined portions of said materials when said materials are brought in contact therewith, each of said elements having a surface adapted to bear against a surface of said materials for compressing said materials to release and spread said fluid between said face-to-face surfaces thereof, means for separating said pair of pressure-applying elements for threading said materials, and means providing a light-tight chamber for said pressure-applying elements, said last-named means comprising a hinged closure member permitting access to said chamber, said closure member mounting one of said elements whereby the latter may be separated from the other of said elements.

18. Photographic apparatus for individually processing a plurality of photographically exposed frames of photosensitive film material in conjunction with a plurality of separately supplied sheets of another material, each of said plurality of sheets releasably carrying a processing fluid in a container, said apparatus comprising, in combination, means for releasably containing said photosensitive film material, said means including an aperture through which an exposed frame of said photosensitive film material may be withdrawn, means comprising a chamber separate from said first-named containing means for holding said sheets of other material, said last-named chamber comprising mechanisms for applying pressure to said sheets for biasing movement thereof within said chamber in a predetermined direction and for maintaining said fluid containers which are incorporated with said sheets of material substantially free from subjection to said biasing means thereby avoiding premature release of the fluid carried by said containers, each frame of photosensitive film material being adapted, upon withdrawal from said first-named aperture, to be superimposed with one of said sheets of other material, and means comprising at least an element having a surface adapted to extend transversely of and parallel to the surfaces of said superimposed film and sheet materials for applying a predetermined pressure to said superimposed materials for releasing and spreading said fluid between facing surfaces thereof, said application of pressure being progressively distributed over said materials while said materials are moved relative thereto, thereby causing the spreading of the fluid throughout said other portions.

19. Apparatus adapted to photographically expose a roll film material comprising a plurality of photographically exposable light-sensitive areas and to process said film after exposure of each of said areas in conjunction with a plurality of separately supplied sheets of another material, said apparatus comprising, in combination, means forming a chamber for releasably holding said roll film, means forming a chamber for releasably holding said plurality of sheets of material for carrying said positive images, means providing an aperture in each of said chambers whereby said materials may be withdrawn therefrom in directions adapted to subsequent superimposition of said materials, means comprising a pair of elements adapted to be positioned transversely across predetermined portions of said materials when said materials are advanced therebetween, each of said elements having a surface adapted to bear against an opposite surface of said materials for compressing said materials, said compressing elements being mounted adjacent the apertures of said chambers for contacting said materials at a point substantially equidistant from each of said chambers in terms of the paths of travel of said materials, said compressing elements being adapted to apply a predetermined pressure progressively to said superimposed materials as the latter are moved relative thereto, means comprising a casing for excluding actinic light from said compressing elements including a pivotal portion upon which one of said compressing elements is mounted, said portion being adapted to be pivoted to an open position so that leaders of said film and other material may be threaded between said elements, and means providing an aperture in said casing for withdrawing said superimposed film and other material therefrom.

20. Apparatus adapted to photographically expose a plurality of photosensitive film units supplied in the form of a film pack and to process said film units after each exposure thereof in conjunction with a plurality of separately supplied sheets of another material, each sheet being adapted to have formed thereupon a visible positive image of a subject image to which said film is exposed when said sheet is superimposed with an exposed film unit and when subjected therewith to a fluid introduced to and spread between facing surfaces of said materials by predetermined applications of pressure thereto, said apparatus comprising, in combination, means providing a chamber comprising a magazine for releasably holding said film pack, means forming a chamber for releasably holding said plurality of sheets of material for carrying said positive images, means providing an aperture in each of said chambers whereby said materials may be withdrawn therefrom in directions adapted to subsequent superimposition with one another, means comprising a pair of elements adapted to be positioned transversely across predetermined portions of said materials when said materials are advanced relative thereto, each of said elements having a surface adapted to bear upon opposite surfaces of the materials for compressing said materials, said elements being mounted adjacent the apertures of said chambers and so positioned that successive predetermined areas of said materials will be brought in contact with said elements simultaneously and compressed thereby for spreading said fluid between facing surfaces thereof and for providing a visible positive image upon a predetermined area of each of said sheets of material adapted to carry said image, means comprising casing portions for excluding actinic light from said compressing elements, one of said portions being movable to provide access to said elements for separating said elements for threading leaders of said materials, and means providing an aperture in said casing portions for withdrawing said superimposed film and image carrier material from said apparatus.

21. Apparatus for successively exposing a plurality of areas of a photosensitive film material and for processing said areas after each exposure thereof when said areas are individually superimposed with similar areas of another separately supplied material and a releasably contained film-processing fluid is positioned between said materials substantially immediately to one side of the aforesaid areas, said apparatus comprising, in combination, means forming a main chamber wherein a supply of said film material may be mounted and wherein individual areas thereof may be advanced to exposure position, means forming a second chamber for releasably holding said other material, means for securing said second chamber means to said main chamber means for movement of said second chamber means relative to said main chamber means whereby in one position of said second chamber relative to said first chamber the apparatus is folded for compactness and in another position of said main chamber and second chamber the apparatus is capable of performing said processing, and means comprising a pair of compressing members positioned with respect to said chambers so that said materials may be advanced from said chambers between said members in superimposed relation, said pair of members coacting with said materials to apply a predetermined pressure to said materials to release and spread said fluid therebetween during relative movement of said materials and said compressing members.

22. Apparatus for successively exposing a plurality of areas of a photosensitive film material and for processing said areas after each exposure thereof when said areas are individually superimposed with similar areas of another separately supplied material and a releasably contained film-processing fluid is positioned between said materials substantially immediately to one side of the aforesaid areas, said apparatus comprising, in combination, means forming a main chamber wherein a supply of said film material may be mounted and wherein individual areas thereof may be advanced to exposure position, means forming a second chamber for releasably holding said other material, means providing an aperture in said main chamber means, and other means providing an aperture in said second chamber means, means for securing said second chamber means to said main chamber means so that said apertures are substantially adjacent one another, and means comprising a pair of members positioned substantially adjacent said apertures for compressing said materials when so withdrawn, said members acting in cooperation with said materials to release and spread said fluid between the materials when said materials are advanced therebetween.

23. Apparatus for exposing a plurality of areas of a photosensitive film material and for processing said areas after exposure thereof when said areas are placed in face-to-face relation with similar areas of another separately supplied material and a collapsible container releasably holding a film-processing fluid is positioned between said materials substantially to one side of the aforesaid areas, said apparatus comprising, in combination, means forming at least a main chamber for releasably mounting a supply of said film material and for positioning individual areas thereof for photographic exposure, means for releasably mounting said other material, means adapted to engage marginal portions of said superimposed materials and to compress together said portions when said materials are moved between said means to effect at least a temporary seal between said portions for confining said fluid between said superposed materials, and means comprising a pair of members between which and with respect to which said materials are adapted to be advanced, said members being capable of compressing the portions of said materials advanced therebetween and acting in cooperation with said materials to release and spread said fluid between said surfaces in face-to-face relation.

24. Apparatus for successively exposing a plurality of areas of a photosensitive film material and for successively processing said areas after exposure thereof while said areas are individually placed in face-to-face relation with similar areas of another material supplied separately relative to said film material and a collapsible container releasably holding a film-processing fluid is positioned between said materials to one side of the aforesaid areas, said apparatus comprising, in combination, means forming a main chamber wherein a supply of said film material may be releasably mounted and positioned for exposure, means forming a second chamber for releasably holding said other material, means for securing said second chamber means to said main chamber means for movement of said second chamber means relative to said main chamber, means whereby in one position of said apparatus a long side of said second chamber is placed adjacent a long side of said main chamber for compactness of said apparatus and in exposure position of said apparatus said second chamber is caused to extend angularly from said main chamber, means providing an aperture in each of said chamber means, and means comprising a pair of members positioned substantially between said apertures for compressing said materials, said members acting in cooperation with said materials to release and spread said fluid between the materials when said materials are advanced therebetween.

25. Apparatus for successively exposing a plurality of areas of a photosensitive film material and for processing said areas after exposure thereof while said areas are individually placed in face-to-face relation with similar areas of another material supplied separately relative to said film material and a collapsible container releasably holding a film-processing fluid is positioned between said materials to one side of the aforesaid areas, said apparatus comprising, in combination, means for photographically exposing said film material comprising mounting means for an extensible bellows, means forming a main chamber wherein a supply of said film material may be releasably mounted and positioned for exposure, means forming a second chamber for releasably holding said other material, means for securing said second chamber means to said main chamber means for movement of said second chamber means relative to said main chamber means whereby in one position said second chamber provides a closure for exposure elements of said apparatus and whereby in another position of said second chamber a wall thereof cooperates with said bellows mounting means to provide a base upon which said bellows may be extended, and means comprising a pair of members positioned for receiving said materials therebetween in superimposed relation from said respective chambers and for compressing said materials to provide, in cooperation with said materials, a flow of said fluid between the materials when said materials are advanced therebetween.

26. Apparatus for successively exposing a plurality of areas of a photosensitive film material and for processing said areas after each exposure thereof when said areas are individually superimposed with similar areas of another material supplied separately from said film and a releasably contained film-processing fluid is positioned between said materials substantially adjacent and to one side of the aforesaid areas, said apparatus comprising, in combination, means forming a main chamber wherein said film material may be exposed, means forming a second chamber for releasably holding said other material, said second chamber means being pivotally mounted with respect to said main chamber means, means providing a light-shielded aperture in said main chamber means and other means providing an aperture in said second chamber means whereby said materials may be withdrawn from said chambers for superimposition with each other, means for superimposing and compressing the materials, said chambers being so related to said compressing means as to have said apertures positioned adjacent said compressing means, said compressing means being adapted to apply a predetermined pressure to successive superimposed increments of said film and other material for spreading said fluid therebetween, and means acting to exclude actinic light from portions of said superimposing means which are in contact with said materials during operation of said apparatus.

27. Apparatus for successively exposing a plurality of areas of a photosensitive film material and for processing said areas after each exposure thereof when said areas are individually superimposed with similar areas of another material supplied separately from said film and a releasably contained film-processing fluid is positioned between said materials substantially adjacent and to one side of the aforesaid areas, said apparatus comprising, in combination, means forming a main chamber wherein said film material may be exposed, means forming a second chamber for releasably holding said other material, said second chamber means being pivotally mounted with respect to said main chamber means, said second chamber means constituting at one position thereof a closure for the front of the apparatus and being adapted to be pivoted away from said position to permit operation of said apparatus, means providing a light-shielded aperture in said main chamber means and other means providing an aperture in said second chamber means whereby said materials may be withdrawn from said chambers for superimposition with each other, means for superimposing and compressing the materials while thus withdrawn, said chambers being so related to said compressing means as to have said apertures positioned adjacent said compressing means, said compressing means being adapted to apply a predetermined pressure to successive superimposed increments of said film and other material for spreading said fluid therebetween, and means acting to exclude actinic light from portions of said superimposing means which are in contact with said materials during operation of said apparatus.

28. Apparatus for exposing a photographic film material and for processing said film material in conjunction with another sheet material, one of said materials having mounted thereon at least one container which releasably holds a liquid capable of carrying out said processing, said apparatus comprising, in combination, means for mounting a supply of said film, means defining an exposure opening for exposing a predetermined area of said film, means for mounting a supply of said other sheet material separately from said film, means between which the exposed area of said film is adapted to be advanced in superposed relation with said other sheet material, said last-named means being adapted to effect at least a temporary bond between the edge portions of said superposed sheet material and film on opposite sides of said exposed area, and means comprising a pair of pressure-applying members between which the superposed film and sheet material are adapted to be advanced with at least one of said containers located therebetween and adjacent the leading edge of said exposed area, said pressure-applying members cooperating with said film and said sheet material to spread the contents of said container throughout at least a predetermined portion of said exposed area to process the same.

EDWIN H. LAND.